United States Patent [19]

Whalen et al.

[11] Patent Number: 4,853,353

[45] Date of Patent: Aug. 1, 1989

[54] METHOD FOR PREVENTING LOW-TEMPERATURE DEGRADATION OF TETRAGONAL ZIRCONIA CONTAINING MATERIALS

[75] Inventors: Philip J. Whalen, Sparta; Franz Reidinger, Convent Station; Robert Antrim, Morris Plains, all of N.J.

[73] Assignee: Allied-Signal Inc., Morris Township, Morris County, N.J.

[21] Appl. No.: 148,726

[22] Filed: Jan. 25, 1988

[51] Int. Cl.$^4$ .............................................. C04B 35/48
[52] U.S. Cl. ..................................... 501/103; 501/105
[58] Field of Search ................................ 501/103, 105

[56] References Cited

U.S. PATENT DOCUMENTS 4,525,464 6/1985 Claussen et al. .................... 501/105
4,690,911 9/1987 Nakada ............................... 501/103

OTHER PUBLICATIONS

Claussen, "Microstructural Design of Zirconia-Toughened Ceramics (ZTC)", Advances in Ceramics, vol. 12, Science and Technology of Zirconia II, American Ceramic Society, Inc., Columbus, Ohio (1984) pp. 325-351.

Shigeto et al., "Transformation Toughened Zirconia (Y-PSZ) Ceramics TASZIC", Technical Paper No. 830520, Toshiba Ceramics Co., Ltd.

*Primary Examiner*—Mark L. Bell
*Assistant Examiner*—Anthony J. Green
*Attorney, Agent, or Firm*—Ernest D. Buff; Gerhard H. Fuchs

[57] ABSTRACT

A ceramic body has a surface region that contains tetragonal zirconia. The body is partially stabilized with yttria and, optionally, ceria. Substantially the entire surface region is composed of recrystallized tetragonal strain free grains of yttrium oxide zirconium oxide. The content of yttrium in the surface region is substantially the same as the average content of yttrium in the ceramic body, and the surface region is covered with a thin layer of stable tetragonal grains.

10 Claims, No Drawings

METHOD FOR PREVENTING LOW-TEMPERATURE DEGRADATION OF TETRAGONAL ZIRCONIA CONTAINING MATERIALS

FIELD OF THE INVENTION

This invention relates to tetragonal zirconia containing materials; and more particularly to the prevention of low temperatures degradation therein.

DESCRIPTION OF THE PRIOR ART

Ceramic materials appointed for structural applications are required to exhibit high hardness, strength, and fracture toughness. One class of materials meeting these criteria are those containing zirconia as a constituent thereof. Zirconia imparts toughness to a material through a stress-induced phase transition from the metastable tetragonal form to the equilibrium monoclinic phase. The transition is accompanied by volume increase of approximately 5 percent, which changes the stress field around an advancing crack. The energy needed to propagate the crack is increased, therefore increasing toughness.

In order to retain zirconia in its tetragonal form at room temperature after sintering, stabilizing oxides like $Y_2O_3$ and $CeO_2$ are added in amounts ranging from 1 to 4 mol. % ($Y_2O_3$). The larger the grain size of the sintered material the more unstable the tetragonal phase becomes. The stability of the tetragonal phase is the major factor determining the degree of toughening the sintered zirconia-containing material will achieve. The toughness of such material increases as the stability of the tetragonal phase decreases.

Zirconia ceramics containing yttria as the stabilizing agent have been shown to have the highest strengths of any material yet tested. The main drawback of these materials is the difficulty of controlling the metastable nature of the tetragonal phase. The same transformation which imparts high strength and toughness can cause a large reduction in strength when the material is exposed to temperatures in the range of 190° C. to 475° C. for an extended period of time. The exact mechanism for this degradation is not yet understood, but it is always accompanied by a large (>70%) monoclinic content on the surface and has been shown to be accelerated by the presence of polar liquids like water. The transformation originates at the surface causing cracks which proceed into the bulk during the degradation process.

The most direct method of preventing degradation of tetragonal zirconia containing materials is to decrease the metastability of the tetragonal phase by either increasing yttria content or by decreasing the grain size. (See T. Sato, et. al., *J. Materials Science*, 1985, 20, 1466–1470). Each of these methods has the disadvantage of reducing the desired high toughness of the material. Also, the composition and firing ranges have to be significantly narrowed, increasing the difficulty of reliable processing. Another method of preventing degradation of tetragonal zirconia containing materials is to effect a change in the surface region thereof as taught by U.S. Pat. No. 4,525,464 to Claussen et al. The stability of the surface region is increased by increasing the surface stabilizer content. A zone of fully stabilized zirconia is created on the surface by sintering the material in a bed of the stabilizing oxide. The stabilization of surfaces by this method is expensive, and is particularly difficult when such surfaces have complex shapes or sharp corners.

There remains a need in the art for an economical, reliable method for protecting zirconia containing material from low temperature degradation without sacrificing bulk toughness.

SUMMARY OF THE INVENTION

The present invention provides a method that is economical to practice and reliable in operation, and by way of which low temperature degradation in tetragonal zirconia, or in materials containing tetragonal zirconia, is virtually eliminated. The method of the invention results in preparation of a ceramic body having a surface region that contains tetragonal zirconia and is partially stabilized with yttria and, optionally, ceria. Generally stated, the method comprises the steps of sintering the body to at least 95% theoretical density at a temperature below about 1550° C.; abrading a portion of the surface region to impart strain and deformation thereto; and heat treating the surface region to recrystallize thereon strain free tetragonal grains of yttrium oxide zirconium oxide, the content of yttrium on the surface region being substantially the same as the average content of yttrium in the ceramic body, such that the surface region is covered with a thin layer of tetragonal grains.

In this manner, a fine grained surface layer of stable tetragonal zirconia is created on bulk metastable tetragonal zirconia which prevents the low temperature surface transformation to monoclinic from occurring. The creation of the fine grain surface layer involves the recrystallization of the surface region through a straining and annealing process. In order for the recrystallization to occur, the surface must first be plastically deformed within a region to increase the degree of strain energy present. Once deformed, the surface region is annealed within a temperature range that allows the nucleation and growth of new strain free grains of controllable size.

In addition, the invention provides a ceramic body having a surface region that contains tetragonal zirconia. The ceramic body is partially stabilized with yttria and, optionally, ceria. Substantially the entire surface region is composed of recrystallized tetragonal strain free grains of yttrium oxide zirconium oxide. The content of yttrium in the surface region is substantially the same as the average content of yttrium in the ceramic body, and the surface region is covered with a thin layer of stable tetragonal grains.

The recrystallization process can be readily performed in a single post-sintering annealing step. Structural ceramics containing tetragonal zirconia are generally machined using diamond wheels. An abraded surface of this type is ideal for recrystallization. Advantageously, complicated parts do not require special treatment as is previously the case for previous surface stabilization techniques. Also, the ceramic body can be provided with a large grain size for optimum toughness while, at the same time, its surface is provided with recrystallized tetragonal strain free grains, having much smaller grain size, that protect the body against low temperature transformation at the surface.

The increased toughness of the ceramic body, together with the increased protection against low temperature surface degradation provided by the recrystallized surface layer thereof, make the ceramic body especially suited for use in structural components such as valves, engine housings, piston chambers, and the like which, during operation, are frequently exposed to temperatures in the range of 190° C. to 400° C. for prolonged periods of time.

DETAILED DESCRIPTION OF THE INVENTION

Transformation toughened ceramics are formed by fabricating nominally 100% tetragonal zirconia bodies using stabilizing cations (i.e. $Y_2O_3$, $CeO_2$) or by incorporating a significant volume percent (5 to 40%) of tetragonal zirconia into the composition. Typically, a particular composition is selected to maximize toughness by adjusting the parameters which control the transformability of the tetragonal phase. The upper limit of toughness is determined by the provision that the tetragonal phase is stable enough to resist the low temperature transformation to monoclinic.

In accordance with the invention, a method is provided whereby the low temperature transformation to monoclinic is prevented within a surface region of the ceramic body, allowing a much greater range of toughness to be achieved in the bulk portion of the body. This technique is compatible with any material containing tetragonal zirconia stabilized with yttria and, optionally, ceria and is particularly suited for a body composed entirely of tetragonal zirconia. Preferably, the ceramic body has a composition consisting essentially of about 2 to 3 mol % yttria, about 0 to 6 wt % ceria, 0 to about 40 wt % alumina, the balance being zirconia plus incidental impurities.

The prevention of the low temperature transformation to monoclinic is brought about by the creation of a protective stable surface layer of fine grained tetragonal phase through recrystallization. By recrystallization is meant that the fine grained surface is the result of growth of new strain free grains from a substantially deformed surface. These recrystallized strain free grains are quite small, having an average grain size ranging from about 0.1 to 0.5 micrometers.

The recrystallization process requires both deformation and high temperature annealing steps. The specific temperature treatment employed depends on the state of the initial tetragonal phase including grain size, stabilizer content, matrix properties, and degree of deformation.

Typically, in heat treating, the ceramic body is heated at a heating rate of about 100° to 500° C./hr to a temperature within a range of about 1000° to 1400° C. The temperature is maintained within the 1000° to 1400° C. range for a time ranging from about 0.5 to 3.0 hrs. The body is then cooled to room temperature at a cooling rate of about 200° to 600° C./hr.

More specifically, in accordance with the invention there is provided a preferred process which is compatible with the processing of most transformation toughened ceramics. The tetragonal zirconia containing material utilized in this process has a composition consisting essentially of 2.45 mol. % $Y_2O_3/ZrO_2$ sintered to at least 98% theoretical density at temperatures below 1550° C. In conducting the preferred process, the surface of the tetragonal zirconia material is abraded with either a 220 or 180 mesh diamond wheel at a surface velocity of 5200 feet per minute with a downfeed rate of 0.0102 mm/pass. The body is then heat treated by heating it at a rate of 200° C./hr to a temperature of 1300° C.; maintaining the temperature at 1300° C. for 1 hour; and cooling the body to room temperature at a cooling rate of 300° C./hr. A body so treated will contain a fine grained (<0.2 u) surface structure. X-ray diffraction patterns of this surface show only the tetragonal form of zirconia.

Ceramic bodies processed in accordance with the present invention have recrystallized on a surface region thereof tetragonal strain free grains in the form of a thin layer. The thickness of this layer of tetragonal grains ranges from about 0.5 to 2 micrometers, and preferably from about 1 to 1.5 micrometers. The surface region of such bodies is 100% in the tetragonal lattice modification and the strain free grains have an average grain size ranging from about 0.1 to 0.5 micrometers.

The abrading step used in effectuating the recrystallization process of the invention is typically a grinding procedure, but can involve alternative mechanical means (i.e. sand blasting) of imparting significant deformation and strain to the surface region of the ceramic body. Materials harder than zirconia, such as alumina, silicon carbide, boron carbide, diamond and the like are suitable for use as grinding media in abrading the surface region.

The heat treatment (annealing) schedule (i.e. time and temperature) for the surface region will vary depending on (1) the state of the deformed tetragonal zirconia i.e. whether the surface region is substantially 100% in the tetragonal lattice modification or is a component in a matrix, (2) the prior heat treatment experienced by the ceramic body (i.e. the grain size of the ceramic body), and (3) the impurity level (particularly of silica) of the ceramic body. In general, the heat treatment temperature is inversely proportional to the sintering temperature, that is, it is decreased as the sintering temperature (and hence the grain size) is increased. Too low an annealing temperature (below about 1000° C.) will prevent a coherent recrystallized layer from forming on the surface region, thus negating any advantageous effect produced by grain size reduction at the surface region. Too high an annealing temperature (above about 1450° C.) causes recrystallized surface grains to grow to a size which are unstable and will transform to the monoclinic form upon subjection of the surface region to low temperature aging. In addition, the upper limit of the heat treatment temperature is markedly effected by the impurity level of components such as silica. At temperatures above 1400° C., the presence of silica at grain boundaries causes the redistribution of yttria in the body, with the result that the surface region becomes enriched in yttria at the expense of the bulk. This effect is highly undesirable; consequently, high purity material having low silica content is preferred.

The composition of the ceramic body is not limited to the 100% tetragonal embodiment. Compositions containing mixed stabilizers like ceria and yttria, and those containing strengthening additives like alumina, are also suitable for use with the process of the invention. Materials containing tetragonal zirconia as a toughening agent in a ceramic matrix should also respond well to the surface treatment provided by the present process. The usable toughness range of these materials should be extended by employing the process of this invention.

The following examples are presented to provide a more complete understanding of the invention. The specific techniques, conditions, materials proportions and reported data set forth to illustrate the principles and practice of the invention are exemplary and should not be construed as limiting the scope of the invention.

EXAMPLE 1

A sample of commercially available 2.45 mol % $Y_2O_3/ZrO_2$ powder was uniaxially pressed at 100 MPa and fired in air at 1400° C. for 3 hours. The sample was surface ground on one side with a LECO 220 mesh diamond wheel and polished on the other side (1 u diamond paste). The piece was reheated to 1300° C. for 3 hours to recrystallize the ground (deformed) side. After aging the sample for 100 hours at 200° C. in air, the surfaces were analyzed by X-ray diffraction. The polished (untreated) side contained about 70% monoclinic phase while the recrystallized (ground and annealed) side was 100% tetragonal, showing no degradation.

EXAMPLE 2

A sample of high purity 2.5 mol % $Y_2O_3/ZrO_2$ was isopressed at 275 MPa and fired at 1550° C. for 3 hours. The surface was polished down to 1 u diamond paste. Several scratches were put in the surface using 220 mesh SiC paper. The surface was then annealed at 1300° C. for 3 hours. The microstructure was examined by SEM. The polished areas contained grains in the 1 u size range. In the scratches the deformed region recrystallized into fine grains on the order of 0.1 to 0.2 u in size.

EXAMPLE 3

A batch of 2.5 mol % $Y_2O_3/ZrO_2$ was slip cast into blocks and fired to 1550° C. for 1 hour. The blocks were sliced into 3×6×50 mm bars for strength testing and 5.08×12.7×57.15 mm bars for IZOD impact testing. One set of bars was surface ground on all sides with a 220 mesh diamond wheel and then annealed at 1200° C. for 1 hour to develop the recrystallized surfaces. These bars were then aged at 200° C. in air for 1000 hours. The aged bars showed no strength degradation; their strengths (960 MPa) were slightly higher then the unaged bars (750 MPa). The impact strengths showed the same trend; unaged 7.7 ft-lbs. and aged 10.7 ft-lbs. In either, case no degradation was seen on the protected samples.

EXAMPLE 3

A cylinder of high purity 2.5 mol % $Y_2O_3/ZrO_2$ was formed by isostatically pressing at 275 MPa followed by sintering at 1500° C. for 2 hours to achieve 99% density. After sintering the cylinder was sliced into 2 mm thick disks. The disks were then surface ground using a 220 mesh diamond wheel at 5200 surface feet per minute with a downfeed rate of 0.0102 mm/pass on one side. The other side was polished down to a 1 u diamond paste. Each sample was then annealed at a temperature ranging from 900° C. to 1500° C. for 2 hours. The annealed pieces were placed in a low temperature furnace and aged for 20 hours at 200° C. X-ray diffraction was used to analyze the phase content of both surfaces of each piece after the low temperature age (see Table I).

TABLE I

| Recrystallization Temperature °C. | Percent Monoclinic Content on Aged Surfaces | |
|---|---|---|
| | Polished Surface | Ground Surface |
| Control (no recrystallization anneal) | 67.7 | 35.3 |
| 900 | 61.2 | 12.7 |
| 1100 | 76.4 | 1.3 |
| 1200 | 50.1 | ND* |
| 1300 | 72.9 | ND |
| 1400 | 64.2 | 1.4 |
| 1500 | 63.9 | 28.4 |

*ND = not detectable

EXAMPLE 5

Isopressed disks of 2 mol % $Y_2O_3/ZrO_2$ containing 2, 4, 6 wt % $CeO_2$ and 5, 10, 15 wt % $Al_2O_3$ were prepared and fired at 1450° and 1500° C., respectively. Surface of these materials were polished and ground as described in Example 1. After aging at 200° C. for 100 hours in air, all surfaces had transformed substantially from tetragonal to monoclinic phase. The samples were then recrystallized at 1300° C. for 3 hours (all surfaces transformed back to tetragonal) and re-aged at 200° C. for 100 hours. The polished side of these materials transformed to monoclinic, while the ground (recrystallized) side remained undegraded (tetragonal).

Having described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A process for preparing a ceramic body having a surface region that consists essentially of tetragonal zirconia and is partially stabilized with yttria and mixtures thereof with ceria comprising the steps of:
   (a) sintering the body to at least 95% theoretical density at a temperature below about 1550° C.;
   (b) abrading a portion of said surface region to impart strain and deformation thereto; and
   (c) heat treating said surface region to recrystallize thereon tetragonal strain free grains of yttrium oxide zirconium oxide, the content of yttrium on said surface region being the same as the average content of yttrium in said ceramic body, such that said surface region is covered with a thin layer consisting solely of tetragonal grains.

2. A process as recited in claim 1, in which said ceramic body has a composition consisting essentially of 2 to 3 mol % yttria, 0 to 6 wt % ceria, and 0 to 40 wt % alumina, the balance being zirconia plus incidental impurities.

3. A process as recited in claim 1, wherein said abrading step is carried out with a diamond wheel having a mesh size of about 120 to 600, a surface velocity of about 100 to 6000 feet per minute and a downfeed rate of about 0.001 to 0.100 mm/pass.

4. A process as recited in claim 1, where said abrading step is carried out with grinding media selected from the group consisting of alumina, silicon carbide, boron carbide and diamond.

5. A process as recited in claim 1, wherein said heat treating step further comprises the steps of:
   (a) heating said body at a heating rate of about 100° to 500° C./hr to a temperature within a range of about 1000° to 1400° C.;
   (b) maintaining said temperature within said range for a time ranging from about 0.5 to 3.0 hrs; and
   (c) cooling said body to room temperature at a cooling rate of about 200° to 600° C./hr.

6. A ceramic body having a surface region that consists essentially of tetragonal zirconia, said ceramic body being partially stabilized with yttria and mixtures thereof with ceria, and having substantially the entire surface region composed of recrystallized tetragonal strain free grains of yttria oxide zirconium oxide, the content of yttrium in said surface region being the same as the average content of yttrium in said ceramic body, such that said surface region is covered with a thin layer consisting solely of stable tetragonal grains.

7. A ceramic body as recited in claim 6, wherein said surface region is substantially 100% in the tetragonal lattice modification and said recrystallized tetragonal strain free grains have an average grain size ranging from about 0.1 to 0.5 micrometers.

8. A ceramic body as recited in claim 6, wherein said layer of tetragonal grains has a thickness ranging from about 0.5 to 2 micrometers.

9. A ceramic body as recited in claim 8, wherein said surface region is substantially 100% in the tetragonal lattice modification.

10. A ceramic body as recited in claim 8 wherein said layer has a thickness ranging from about 1 to 1.5 micrometers.

* * * * *